US010250435B2

(12) United States Patent
Suryanarayana

(10) Patent No.: US 10,250,435 B2
(45) Date of Patent: Apr. 2, 2019

(54) SYSTEM AND METHOD FOR INTELLIGENT DISCOVERY AND RESCUE OF DEVICES IN AN INTERNET-OF-THINGS NETWORK

(71) Applicant: DELL PRODUCTS, LP, Round Rock, TX (US)

(72) Inventor: Shekar Babu Suryanarayana, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 365 days.

(21) Appl. No.: 15/163,237

(22) Filed: May 24, 2016

(65) Prior Publication Data

US 2017/0346677 A1  Nov. 30, 2017

(51) Int. Cl.
| | |
|---|---|
| H04L 12/24 | (2006.01) |
| H04L 29/08 | (2006.01) |
| H04L 12/66 | (2006.01) |
| H04W 8/00 | (2009.01) |
| H04W 12/00 | (2009.01) |

(Continued)

(52) U.S. Cl.
CPC .......... *H04L 41/0668* (2013.01); *H04L 12/66* (2013.01); *H04L 45/22* (2013.01); *H04L 45/28* (2013.01); *H04L 67/12* (2013.01); *H04L 69/40* (2013.01); *H04W 4/70* (2018.02); *H04W 8/005* (2013.01); *H04W 12/00* (2013.01);
(Continued)

(58) Field of Classification Search
CPC ....... H04L 41/0668; H04L 9/00; H04L 12/66; H04L 45/22; H04L 45/28; H04L 67/12; H04L 69/40; H04L 43/0811; H04W 4/70; H04W 8/005; H04W 12/00; H04W 12/12; H04W 76/00
See application file for complete search history.

(56) References Cited

U.S. PATENT DOCUMENTS

| | | | |
|---|---|---|---|
| 6,885,848 | B2 | 4/2005 | Lee |
| 6,956,480 | B2 | 10/2005 | Jespersen |

(Continued)

FOREIGN PATENT DOCUMENTS

| | | |
|---|---|---|
| IN | 255970 A | 11/2008 |
| JP | 2001-103149 A | 4/2001 |
| WO | WO 1997/048083 A1 | 12/1997 |

OTHER PUBLICATIONS

"Apple can track you even after your iPhone battery dies." V. Woollaston, Daily Mail, Mar. 5, 2014; pp. 1-3 http://www.dailymail.co.uk/sciencetech/article-2573761/Apple-track-AFTER-iPhone-battery-dies-Sensors-continue-collect-data-phone-dead.html.

(Continued)

*Primary Examiner* — Ryan J Jakovac
(74) *Attorney, Agent, or Firm* — Larson Newman, LLP

(57) ABSTRACT

A device network includes an Internet-of-things (IoT) device, a gateway device, a communication device, and a monitor system. The monitor system establishes a first communication path to the IoT device via the gateway device, determines that the gateway device has failed and that the first communication path has been interrupted, determines that the communication device is within communications range of the IoT device, and directs the communication device to establish a second communication path between the IoT device and the monitor system via the communication device in response to determining that the communication device is within communications range of the IoT device.

20 Claims, 9 Drawing Sheets

(51) Int. Cl.
    *H04W 12/12*      (2009.01)
    *H04W 76/00*      (2018.01)
    *H04L 12/707*     (2013.01)
    *H04L 12/703*     (2013.01)
    *H04L 29/14*      (2006.01)
    *H04W 4/70*       (2018.01)
    *H04L 12/26*      (2006.01)

(52) U.S. Cl.
    CPC ........... *H04W 12/12* (2013.01); *H04W 76/00* (2013.01); *H04L 43/0811* (2013.01)

(56) References Cited

U.S. PATENT DOCUMENTS

| | | | |
|---|---|---|---|
| 2015/0364027 A1* | 12/2015 | Haupt | G01W 1/02 |
| | | | 340/521 |
| 2016/0197786 A1* | 7/2016 | Britt | H04W 4/70 |
| | | | 370/255 |
| 2017/0230280 A1* | 8/2017 | Prunet | H04L 12/2825 |

OTHER PUBLICATIONS

"Quick Guide: How to Use Lookout to Find a Lost Phone," Lookout Blog, Apr. 27, 2011, pp. 1-4 https://blog.lookout.com/blog/2011/04/27/quick-guide-on-how-to-use-lookout-to-find-a-lost-phone/.

* cited by examiner

SYSTEM AND METHOD FOR INTELLIGENT DISCOVERY AND RESCUE OF DEVICES IN AN INTERNET-OF-THINGS NETWORK

FIELD OF THE DISCLOSURE

This disclosure generally relates to information handling systems, and more particularly relates to intelligent discovery and rescue of devices in an Internet-of-things network.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A device network can include an Internet-of-things (IoT) device, a gateway device, a communication device, and a monitor system. The monitor system may establish a first communication path to the IoT via the gateway device, determine that the gateway device has failed and that the first communication path has been interrupted, determine that the communication device is within communications range of the IoT device, and direct the communication device to establish a second communication path between the IoT device and the monitor system via the communication device in response to determining that the communication device is within communications range of the IoT device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. The use of the same reference symbols in different drawings indicates similar or identical items. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein, and will focus on specific implementations and embodiments of the teachings. This focus is provided to assist in describing the teachings, and should not be interpreted as limiting the scope or applicability of the teachings. Moreover, other teachings can be used along with the teachings of this disclosure, and the teachings of this disclosure can be used along with other disclosures.

Figure 1:
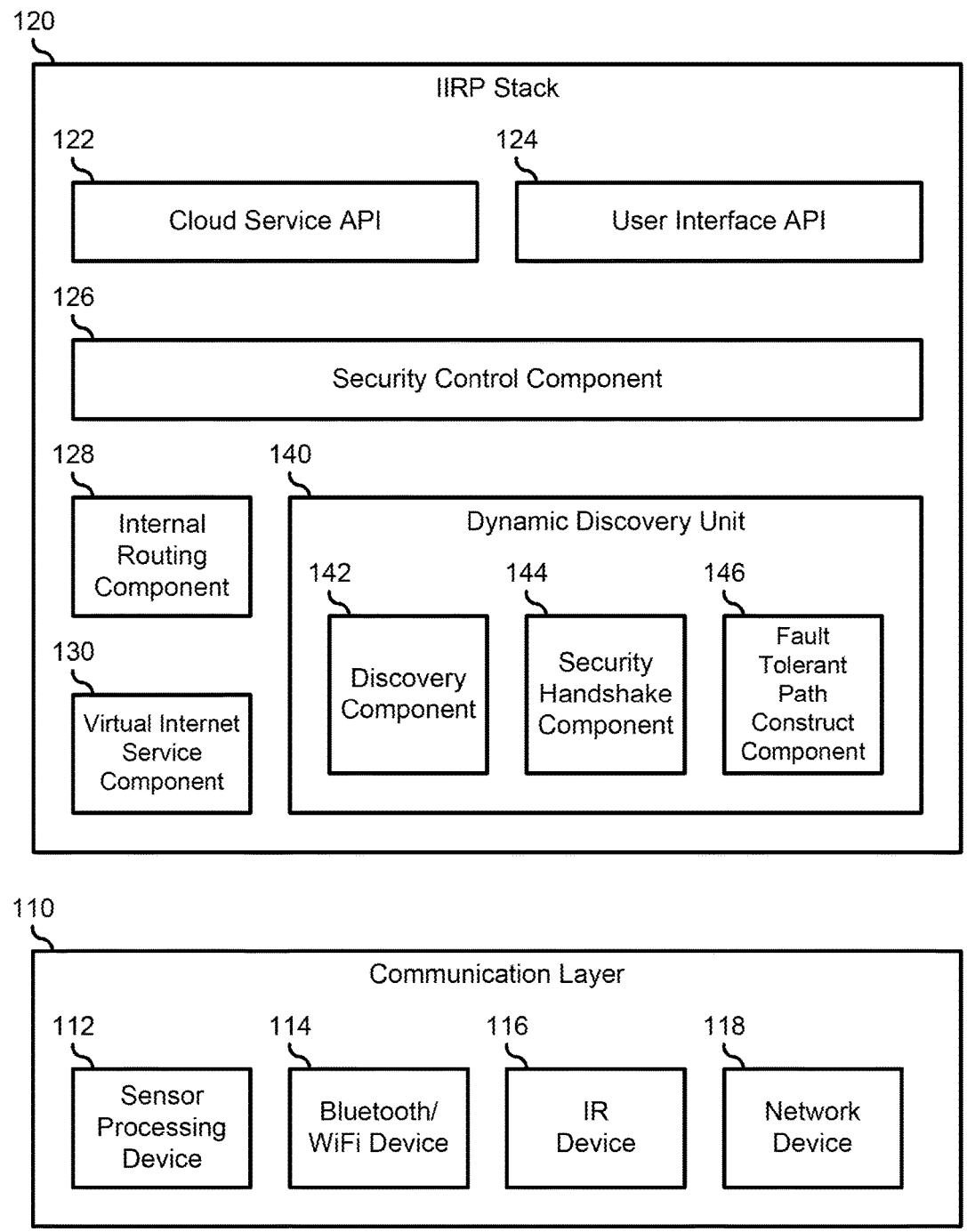
FIG. 1 is a block diagram of a communication device according to an embodiment of the present disclosure.

FIG. 1 illustrates a communication device 100 that is configured to communicate data between itself and one or more additional communication devices in a network. In particular, communication device 100 operates to provide a bridging function between the one or more additional communication devices, such that the bridged communication devices can communicate with each other through communication device 100. For example, communication device 100 can represent a smartphone, a tablet device, a WiFi router, or the like, that provides a bridge between a network and one or more communication devices connected to the communication device. Here, the network can provide for communications with a data network, such as a cellular telephone network, a private internet, the Internet, or the like, and the connected communication devices can include WiFi devices, short range Personal Area Network (PAN) devices (e.g., Bluetooth devices, Near Field Communications (NFC) devices, Infrared Data Association (IrDA) devices, or the like), wired devices (e.g., Universal Serial Bus (USB) devices, Firewire devices, Ethernet devices, or the like) or other communication devices, as needed or desired.

Communication device 100 includes a communication layer 110 and an Internet-of-Things (IoT) Based Intelligent Rescue Mode Protocol (IIRP) stack 120. Communication layer 110 represents various hardware interfaces of communication device 100 that provide for the connectivity to the one or more connected communication devices. As such, communication device 100 includes a sensor processing device 112, a Bluetooth/WiFi device 114, an Infrared (IR) device 116, and a network interface device 118. Sensor processing device 112 represents various devices and interfaces that receive and process sensor information from one or more sensors of communication device 100. For example, sensor processing device 112 can include a Global Positioning System (GPS) sensor or device, and sensor processing device 112 can operate to process GPS signals to determine a location for the communication device. Bluetooth/WiFi device 114 represents various medium and short range communication devices and interfaces that provide for connectivity to the one or more connected communication devices. For example, Bluetooth/WiFi device 114 can include one or more of a Bluetooth communication device in accordance with one or more Bluetooth standards, a WiFi communication device in accordance with one or more IEEE 802.11 standards, a ZigBee communication device in accordance with one or more IEEE 802.15 standards, or another wireless communication device, as needed or desired.

IR device 116 represents various optical-based devices and interfaces that provide for line-of-sight connectivity to the one or more connected communication devices. For example, IR device 116 can include one or more of a Light Fidelity (LiFi) communication device in accordance with the IEEE 802.15.7 standard, an Infrared Data Association (IrDA) communication device in accordance with one or more IrDA specifications, or another optical-based communication device, as needed or desired. Network device 118 represents various Local Area Network (LAN) and Wide Area Network (WAN) devices and interfaces that provide the network connectivity for communication device 100. For example, network device 118 can include one or more of wired LAN devices and interfaces, such as an Ethernet communication device or the like. In another example, network device 118 can include one or more of wireless LAN devices and interfaces, such as a WiMax communication device or the like.

Communication device 100 is configured to operate in an Internet-of-Things (IoT), either as an IoT endpoint, or as a communication node for the distribution of information from a network of IoT devices. An IoT is a network of electronic devices embedded in various physical objects, such as vehicles, industrial process equipment, medical equipment, household appliances, and the like. The electronic devices often take the form of a System-on-a-Chip (SoC) that integrates the components of an information handling system onto a single integrated circuit, including processing components, memory components, and input/output (I/O) components. The electronic devices can include various sensors, actuators, or other mechanisms for monitoring or performing work, and communications interfaces for exchanging information with other electronic devices in the network.

IIRP stack 120 provides for robust, dynamic, fault tolerant communications in an IoT network. In a particular embodiment, IIRP stack 120 operates to provide an as-needed backup communication bridge between a network of IoT devices and a network-based monitor system configured to monitor the IoT device network. Here, in the event of a failure of a node in an established network path between the IoT device network and the monitor system, IIRP stack 120 operates to determine if the IoT device network is accessible to communication device 100, to publish to the monitor system if the IoT device network is accessible, and to receive an authorization from the monitor system to establish a communication link to the IoT device network, thereby establishing the backup communication bridge.

In another embodiment, IIRP stack 120 operates to provide beacon and location services for misplaced devices, such as devices that have been lost or stolen. Here, a misplaced device can be pre-configured to include an IIRP stack similar to IIRP stack 120. Then, when the device determines that it has been misplaced, the device provides a beacon to other IIRP enabled devices that are within communication range, that is, another device that is within range that is also configured with an IIRP stack similar to IIRP stack 120. Then, if another IIRP enabled device is discovered, location information associated with the other IIRP enabled device is communicated to a monitor system to inform an owner of the misplaced device as to the location of the misplaced device.

In yet another embodiment, IIRP stack 120 operates to provide proxied Internet services and fault tolerant routing for an IoT device network that is otherwise without access to Internet services. Here, an IoT device in the IoT device network can be pre-configured to include an IIRP stack similar to IIRP stack 120. Then, when the IoT device determines that it, or one or more other IoT devices in the IoT device network needs to access an Internet service that is not otherwise available to the IoT device network, the IIRP enabled IoT device provides a beacon to other IIRP enabled devices that are within communication range, to determine if any of the IIRP enabled devices have access to the Internet service, and to request access to the Internet service from the other IIRP enabled devices. Further, where the IoT device network includes multiple IIRP enabled IoT devices, each of the other IIRP enabled IoT devices can request access to the Internet service from different IIRP enabled devices that are within communication range, thereby creating alternate paths to the Internet service for the IoT device network.

IIRP stack 120 includes a cloud service application program interface (API) 122, an user interface API 124, a security control component 126, an internal routing component 128, a virtual Internet service component 130, and a dynamic discovery unit 140. Cloud service API 122 provides an interface between the functions and features of IIRP stack 120 and cloud services that are utilized by the IoT device network. User interface API 124 provides an interface between the functions and features of IIRP stack 120 and the higher level modules, functions, and applications of communication device 100. Security control component 126 operates to provide and maintain encryption, decryption, and tunneling of the IoT device network communication that are handled by communication device 100. Internal routing component 128 operates to provide internal routing and conversion from a protocol stack associated with a first device of communication layer 110, and another protocol stack associated with another device of the communication layer. Virtual Internet service component 130 operates to provide proxied Internet services to an IoT device network that is not otherwise connected to the Internet.

Dynamic discovery unit 140 includes a discovery component 142, a security handshake component 144, and a fault tolerant path construct component 146. Discovery component 142 operates to search for and find other IIRP enabled devices in the vicinity of communication device 100, or in the vicinity of a remote IoT device that has lost connectivity to a monitor system. Security handshake component 144 operates to provide security operations between the IoT device of the IoT device network and the monitor system or other system on the network. Fault tolerant path construct component 146 operates to find and maintain a shortest path between a source IoT device and a destination IoT device, and provides for redundant links for dynamic switch-over when a primary node fails.

Figure 2:
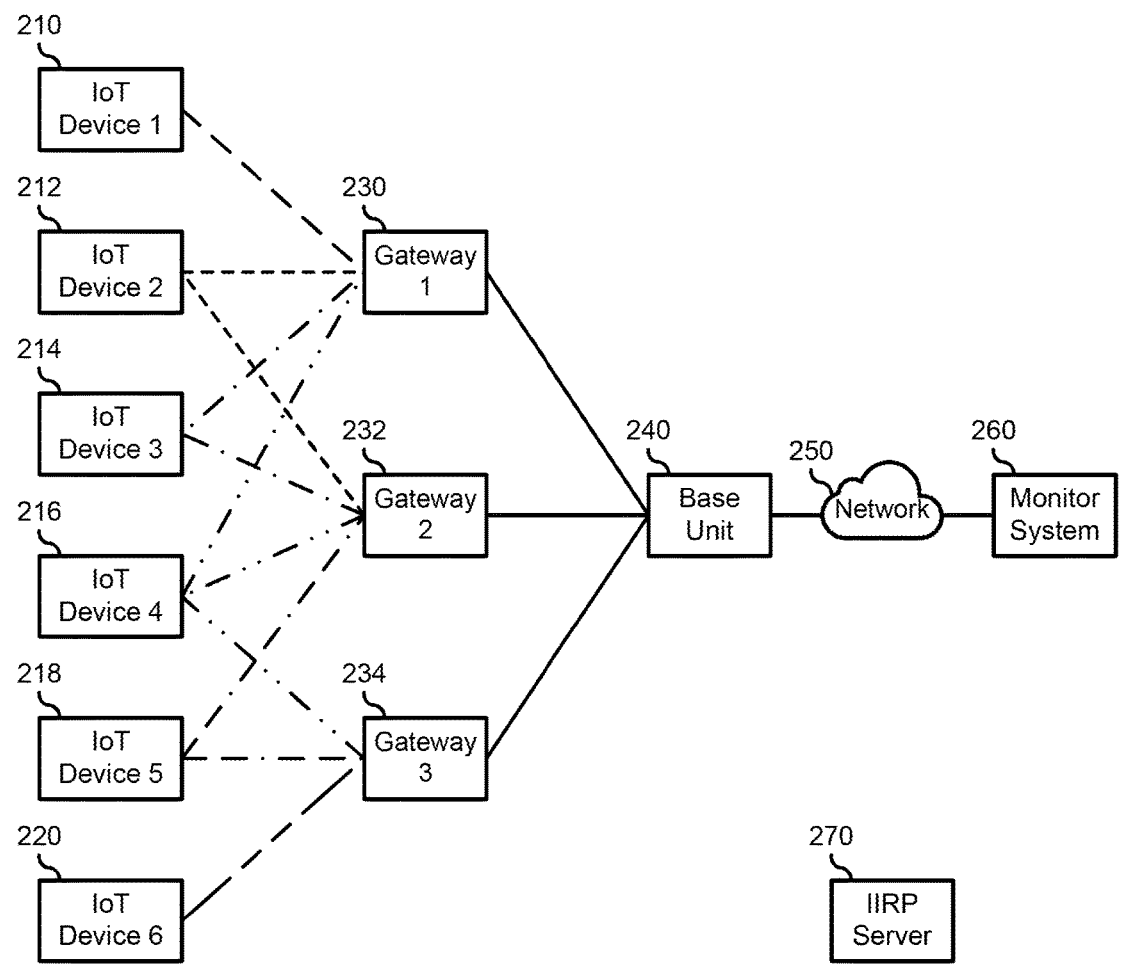
FIGS. 2-4 are block diagrams illustrating an Internet-of-Things (IoT) network and a method of providing an as-needed backup communication bridge between devices of the network according to an embodiment of the present disclosure.
Figure 3:
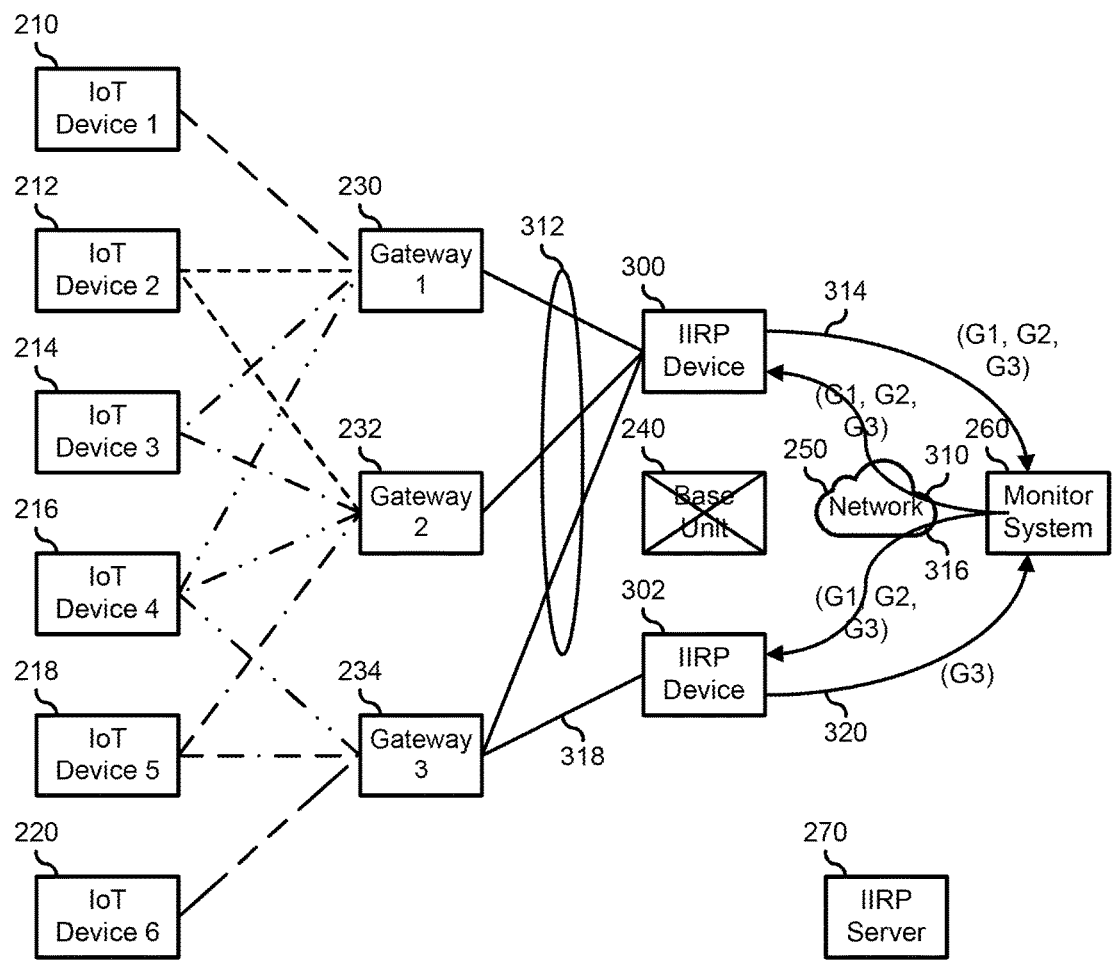
Figure 4:
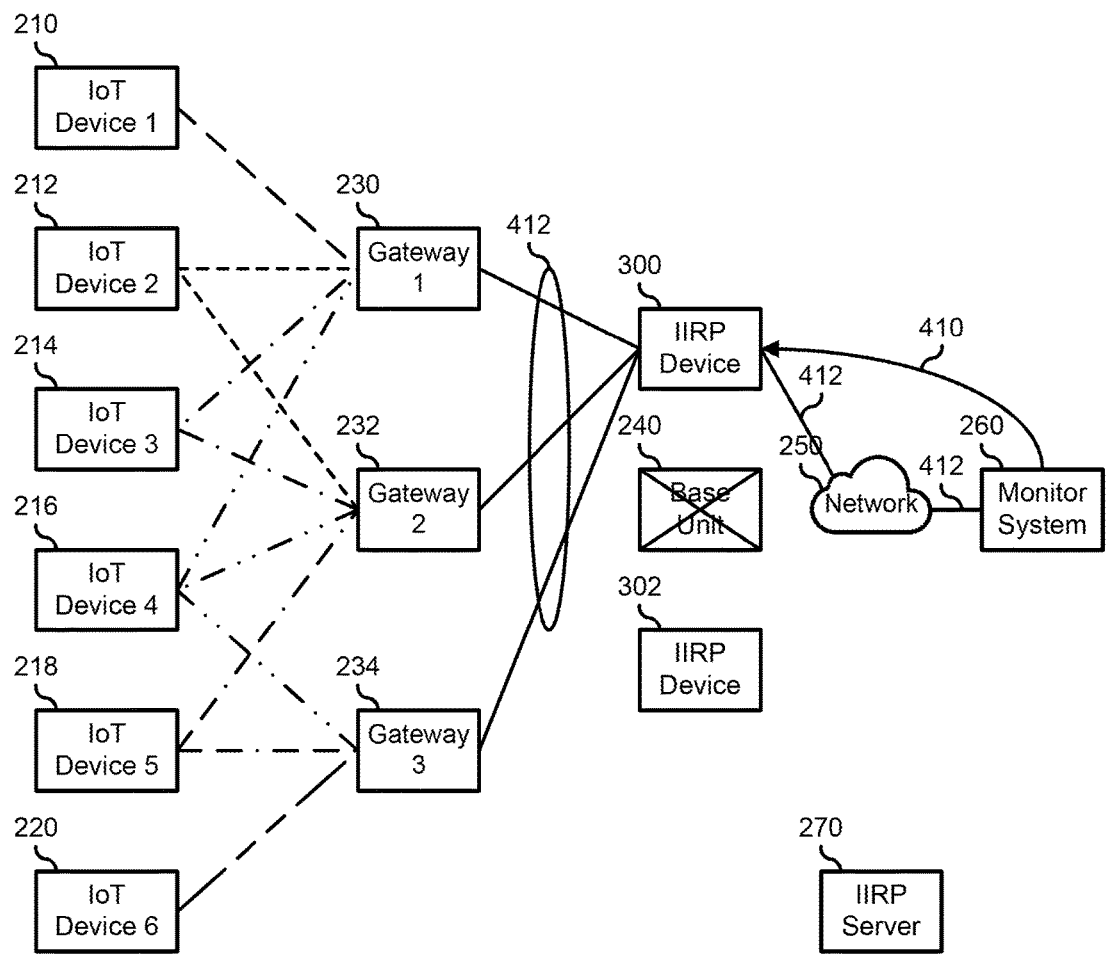

FIGS. 2-4 illustrate an IoT device network 200 including IoT devices 210, 212, 214, 216, 218, and 220, gateways 230, 232, and 234, a base unit 240, a network 250, a monitor system 260, and an IIRP administration server 270. IoT device network 200 operates to provide connectivity between IoT devices 210-220 and monitor system 260 via gateways 230-234, base unit 240, and network 250. IoT devices 210, 212, 214, and 216 are connected to gateway 230, which in turn is connected to base unit 240. IoT devices 212, 214, 216, and 218 are connected to gateway 232, which in turn is connected to base unit 240. IoT devices 216, 218, and 220 are connected to gateway 234, which in turn is connected to base unit 240. Base unit 240 is connected to monitor system 260 via network 250.

Examples of IoT devices 210-220 include household IoT devices such as network connected home lighting devices, thermostats, smoke detectors and alarm systems, and the like, commercial IoT devices such as network connected cash registers, vending machines, utility meters, and the like, industrial IoT devices such as gas monitors, process equipment controls, and the like, medical IoT devices such as monitors, patient communication devices, and the like, or other IoT devices as needed or desired. Gateways 230-234 represent first level of connectivity to IoT devices 210-220. In particular, gateways 230-234 can include wired or wireless network routers, WiFi access points, or other network devices. Note that one or more of IoT devices 210-220 can represent a subnetwork of IoT devices. Base unit 240 represents a second level of connectivity to gateways 230-234. Network 250 represents a data distribution network such as a private internet or the Internet. Monitor system 260 represents a remote monitoring system for monitoring and controlling IoT devices 210-220. For example, monitoring system 260 can include a remote monitoring site for IoT devices 210-220, a hosted website into which a user can log in to monitor the IoT devices, or the like. IIRP administration server 270 will be described further, below.

FIGS. 3 and 4 illustrate a method of providing an as-needed backup communication bridge between a IoT devices 210-220 and monitor system 260. Here, base unit 240 is shown as experiencing a failure to provide connectivity between gateways 230, 232, and 234, and network 250. In this case, monitor system 260 can infer that base unit 240 has somehow failed because monitoring information from all of IoT devices 210-220 ceases to be received by the monitor system. In this case, monitor system 260 can invoke an IIRP recovery procedure that identifies IIRP devices 300 and 302 that are in the vicinity of base unit 240, and that can connect to one or more of gateways 230, 232, and 234. In a particular embodiment, the IIRP system utilizes location information associated with base unit 240, such as GPS coordinates, IP address mapping information, or other location information, to broadcast a location based request for other devices that are proximate to the base unit. In another embodiment, IIRP administration server 270 operates to compile and maintain location information for IIRP devices 300 and 302. Here, monitor system 260 sends a request to IIRP administration server 270 to determine the identity of IIRP devices that are proximate to base unit 240, and the IIRP administration server provides information identifying IIRP devices 300 and 302 to the monitor system. With the identity information for IIRP devices 300 and 302 in hand, monitor system 260 initiates an access request 310 to IIRP device 300. IIRP device 300 responds to access request 310 by determining 312 that the IIRP device is able to access gateways 230, 232, and 234. IIRP device 300 then provides an access request reply 314 that indicates that all three of gateways 230, 232, and 234 are accessible to the IIRP device. Similarly, monitor system 260 initiates an access request 316 to IIRP device 302. IIRP device 302 responds to access request 316 by determining 318 that the IIRP device is only able to access gateway 234, and the IIRP device provides an access request reply 320 that indicates that only gateway 234 is accessible to the IIRP device.

In FIG. 4, monitor system 260 determines that, because IIRP device 300 is able to access gateways 230, 232, and 234, IIRP device 300 is a more suitable alternate to base unit 240. As such, monitor system 260 issues IIRP device 300 a grant of poser of access (GPA) 410, permitting IIRP device 300 to establish a connection 412 between gateways 230, 232, and 234 and the monitor system. In this way, access to IoT devices 210-220 is reestablished via IIRP device 300. In a particular embodiment, monitor system 260 provides an indication to IIRP administration server 270 of the determination to reestablish the connection with IoT devices 210-220 via IIRP device 300, and the IIRP administration server issues the GPA to the IIRP device. In another embodiment, monitor system 260 also issues a GPA to IIRP device 302 in order to establish a redundant connection to gateway 234.

In a particular embodiment, by similarly determining that only the connectivity to, for example, IoT device 210 is lost, monitor system 260 can infer that gateway 230 has somehow failed because only the monitoring information from of IoT device 210 ceases to be received by the monitor system. In this case, monitor system 260 can invoke the IIRP recovery procedure to identify an IIRP device that is in the vicinity of gateway 230, gateway 230 being the only gateway that is connected to IoT device 210, and that can connect to the IoT device. In this way, any connection node in a large network of IoT devices can fail and monitor system 260 can reestablish connectivity to the affected IoT devices.

In another embodiment, one or more of IoT devices 210-220 are connected to monitor system 260 via encrypted channels, such as via a virtual private network (VPN) or another tunneling mechanism. Here, IIRP devices 300 and 302 can simply act as a node in the network between IoT devices 210-220 and monitor system 260, passing the encrypted data without any view or knowledge of the contents of the data. In this way, IIRP devices 300 and 302, when inserted into the connection path, do not constitute any additional security risk. In another embodiment, one or more of IIRP devices 300 and 302 operate to establish separate and independent encrypted channels with one or more of IoT devices 210-220 and with monitor system 260. Here, IIRP devices 300 and 302 may represent an increased security risk, but the risk can be mitigated by selectively issuing GPAs only to trusted devices.

Figure 5:
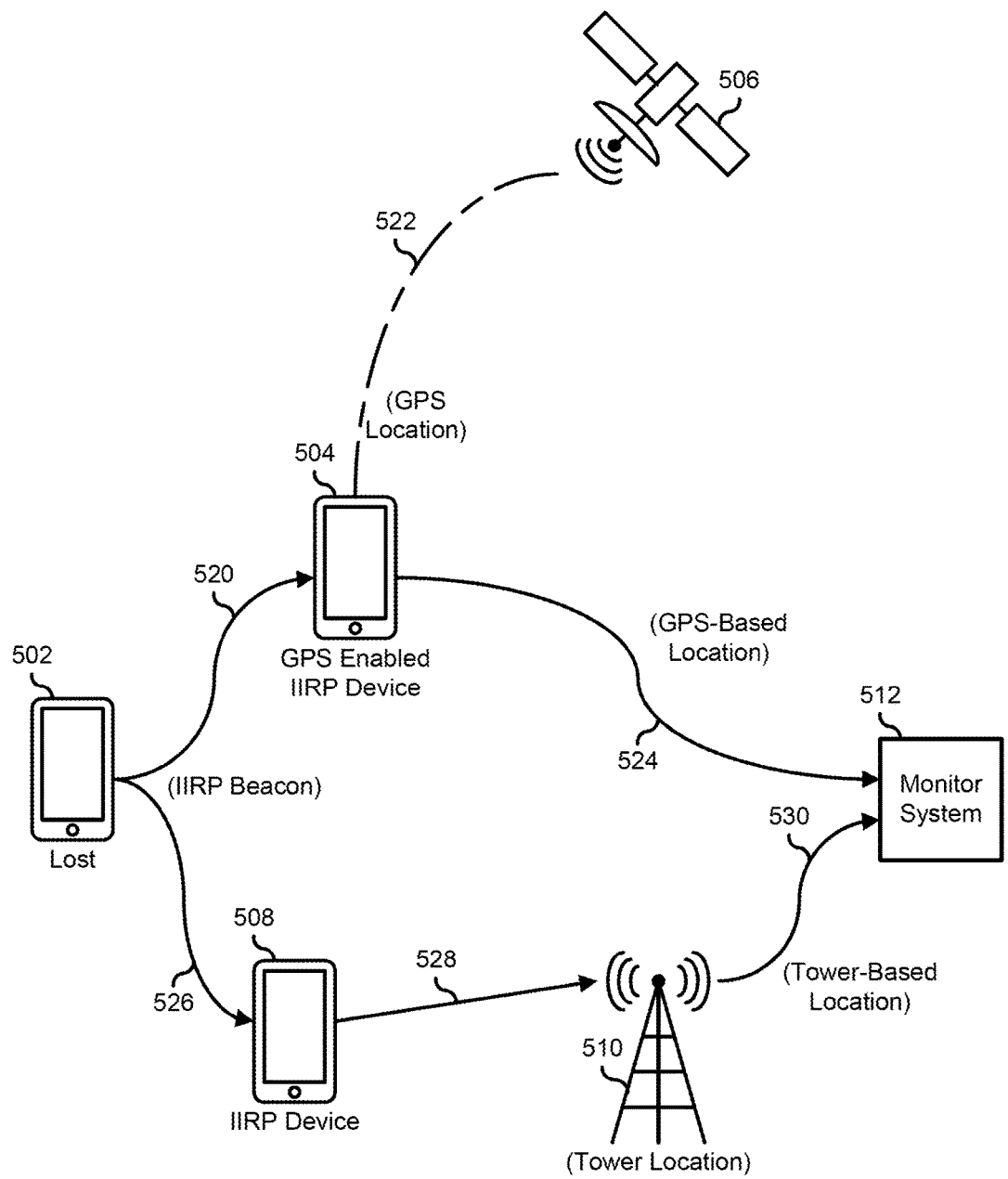
FIG. 5 is an illustration of a network that provides beacon and location services for misplaced devices according to an embodiment of the present disclosure.

FIG. 5 illustrates a device network 500 including IIRP devices that operate to provide beacon and location services for misplaced devices. Device network 500 includes a device 502, a GPS enabled IIRP device 504, a GPS system 506, an IIRP device 508, a cellular tower 510, and a monitor system 512. Device 502 is an IIRP enabled device that includes an IIRP stack similar to IIRP stack 120. Here, device 502 operates to determine whether it has been misplaced, such as when the device is lost or stolen. For example, device 502 can determine that it has been misplaced when a user unsuccessfully attempts to enter a password or unlock code more than a predetermined number of times, when the primary battery of the device has a charge of lower than a predetermined level, when the primary battery is removed from the device, or when other conditions are detected. In a particular embodiment, device 502 determines that it has been misplaced when a user unsuccessfully attempts to enter a password or unlock code more than three (3) times in a minute or more than five times in succession, when the primary battery falls below a five (5) percent charge and the user once unsuccessfully attempts to enter the password or unlock code, or when the primary battery falls below a two (2) percent charge.

In any case, when device 502 determines that the device has been misplaced, the device provides an IIRP beacon to determine if any other IIRP devices are within range of the device. Here, GPS enabled IIRP device 504 is detected 520 as being within range of device 502. GPS enabled IIRP device 504 is provided with location information 522 that identifies a location of the GPS enabled IIRP device. GPS enabled IIRP device 504 then provides 524 GPS-based location information for the GPS enabled IIRP device to monitor system 512, along with an indication that device 502 has been misplaced at a location that is proximate to the GPS enabled IIRP device. For example, if device 502 is able to establish a WiFi connection to GPS enabled IIRP device 504, then the user can infer that the misplaced device 502 is within WiFi signal communication range of GPS enabled IIRP device 504. In a particular embodiment, when GPS enabled IIRP device 504 provides 524 the GPS-based location information for the GPS enabled IIRP device and the indication that device 502 has been misplaced, the GPS enabled IIRP device also provides a signal strength associated with the connection between the GPS enabled IIRP device and the misplaced device, so that a user of the monitor system can estimate how far the misplaced device is from the GPS enabled IIRP device.

In addition to detecting GPS enabled IIRP device 504, IIRP device 508 is detected 526 as being within range of device 502. IIRP device 508 is connected to cellular tower 510 which is provided at a particular physical location 528 that is known and predetermined. Here, IIRP device 508 provides 530 the physical location 528 of cellular tower 510 to monitor system 512, along with an indication that device 502 has been misplaced at a location that is proximate to the cellular tower. For example, if device 502 is able to establish a WiFi or Bluetooth connection to IIRP device 504, then the user can infer that the misplaced device is within WiFi or Bluetooth signal communication range of GPS enabled IIRP device 504. In a particular embodiment, misplaced device 502 establishes a connection directly to cellular tower 510, and the user can infer that the misplaced device is within range of the cellular tower. While this may confer as accurate a location as may be provided by the establishment of a WiFi or Pan connection, it may still be sufficient to direct a user to a general area within which device 502 is located. Note that, if misplaced device 502 is also a GPS enabled device, then one of GPS enabled IIRP device 504 and IIRP device 508 can also provide monitor system 512 with the location of the misplaced device based upon the misplaced device's GPS coordinates.

Figure 6:
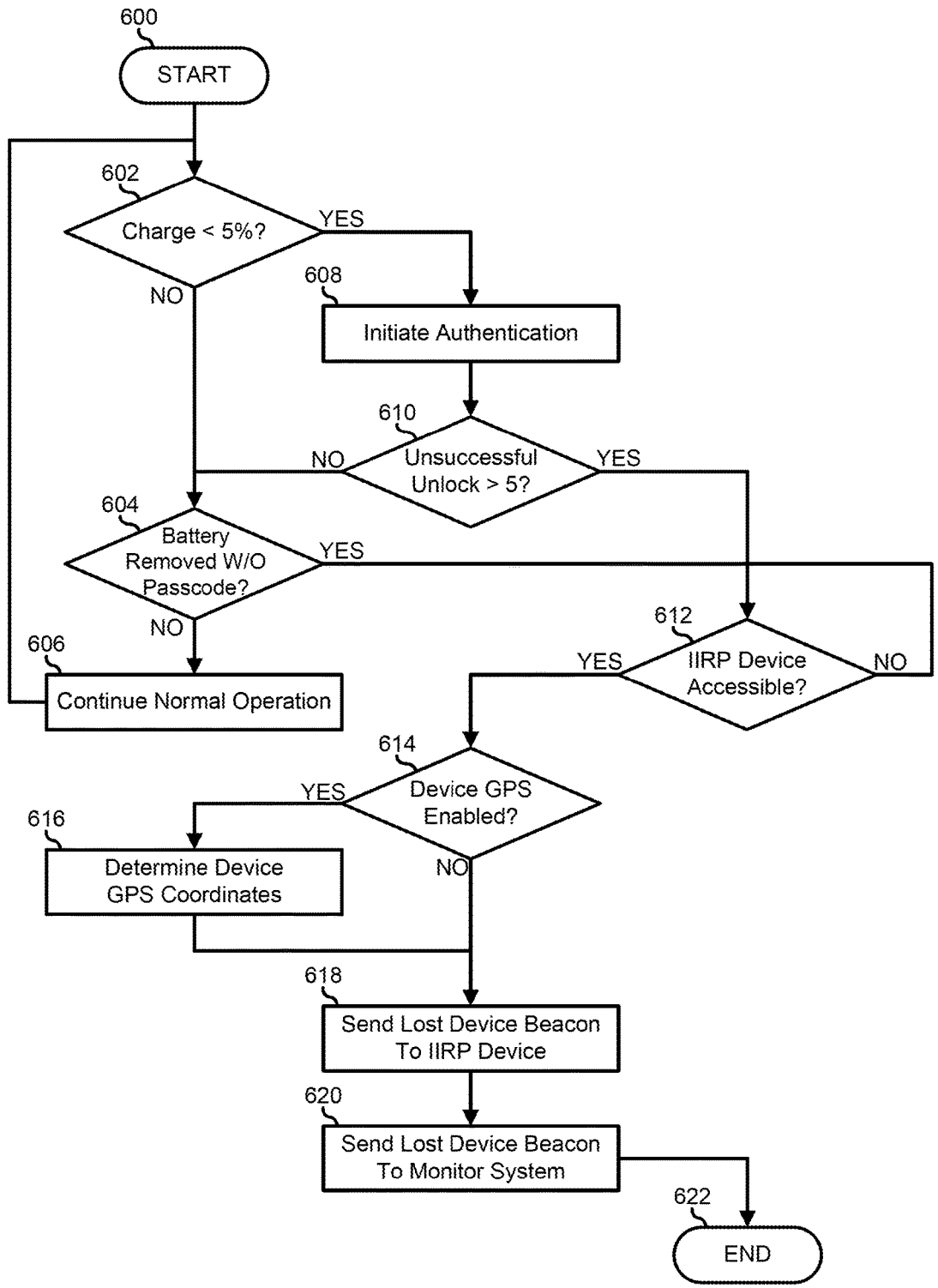
FIG. 6 is a flowchart illustrating a method for providing beacon and location services for misplaced devices according to an embodiment of the present disclosure.

FIG. 6 illustrates a method for providing beacon and location services for misplaced devices, starting at block 600. A determination is made by a communication device as to whether or not the state of the battery charge is below 5% in decision block 602. If not, the "NO" branch of decision block 602 is taken and a determination is made as to whether or not a battery of the communication device has been removed from the device without a user of the communication device entering a valid battery removal passcode in decision block 604. If not, that is, if either the battery was not removed, or the battery was removed in conjunction with a user entering a valid battery removal passcode, the "NO" branch of decision block 604 is taken, normal operations of the communication device are continued in block 606, and the method returns to decision block 602 where the determination is again made as to whether or not the state of the battery charge is below 5%. If the battery of the communication device has been removed from the device without the user of the communication device entering the valid battery removal passcode, the "YES" branch of decision block 604 is taken and the method proceeds to decision block 612, as described further, below.

Returning to decision block 602, if the state of the battery charge is below 5%, the "YES" branch of decision block 602 is taken, an authentication session is initiated on the communication device in block 608, and a decision is made as to whether or not more than five (5) unsuccessful attempts have been made to unlock the communication device in decision block 610. If not, that is, if the communication device was successfully unlocked in five (5) or less attempts, the "NO" branch of decision block 610 is taken and the method continues at decision block 604, where the a determination is made as to whether or not the battery has been removed from without a user entering a valid battery removal passcode. If more than five (5) unsuccessful attempts have been made to unlock the communication device, the "YES" branch of decision block 610 is taken and the method proceeds to decision block 612, as described further, below.

If the method has proceeded to decision block 612, then the communication device is determined to be misplaced. If the communication device is misplaced, the communication device determines if an IIRP enabled device is accessible and within communication range of the communication device in decision block 612. If not, the method loops back to decision block 612 until such time that the communication device determines if an IIRP enabled device is accessible and within communication range of the communication device, the "YES" branch of decision block 612 is taken, and a determination is made as to whether or not the communication device is a GPS enabled communication device in decision block 614. If so, the "YES" branch of decision block 614 is taken, the communication device determines the GPS coordinates for the communication device in block 616, and the method proceeds to block 618, as described further, below.

Returning to decision block 614, if the communication device is not a GPS enabled communication device, the "NO" branch is taken and the communication device issues a lost device beacon to the IIRP devices that are within communication range of the communication device in block 618. If the communication device has determined GPS coordinates for the communication device, as shown in block 616, then the lost device beacon will include the GPS coordinates for the communication device. The IIRP device sends the lost device beacon, including the GPS coordinates for the communication device if available, to a monitor system in block 620, and the method ends in block 622. When the IIRP device send the lost device beacon to the monitor system, the IIRP device includes location information associated with the IIRP device. For example, if the IIRP device is a GPS enabled IIRP device, then the IIRP device will include GPS location information for the IIRP device in the lost device beacon, or if the IIRP device is associated with a particular cellular tower, the IIRP device will include location information for the cellular tower in the lost device beacon.

Figure 7:
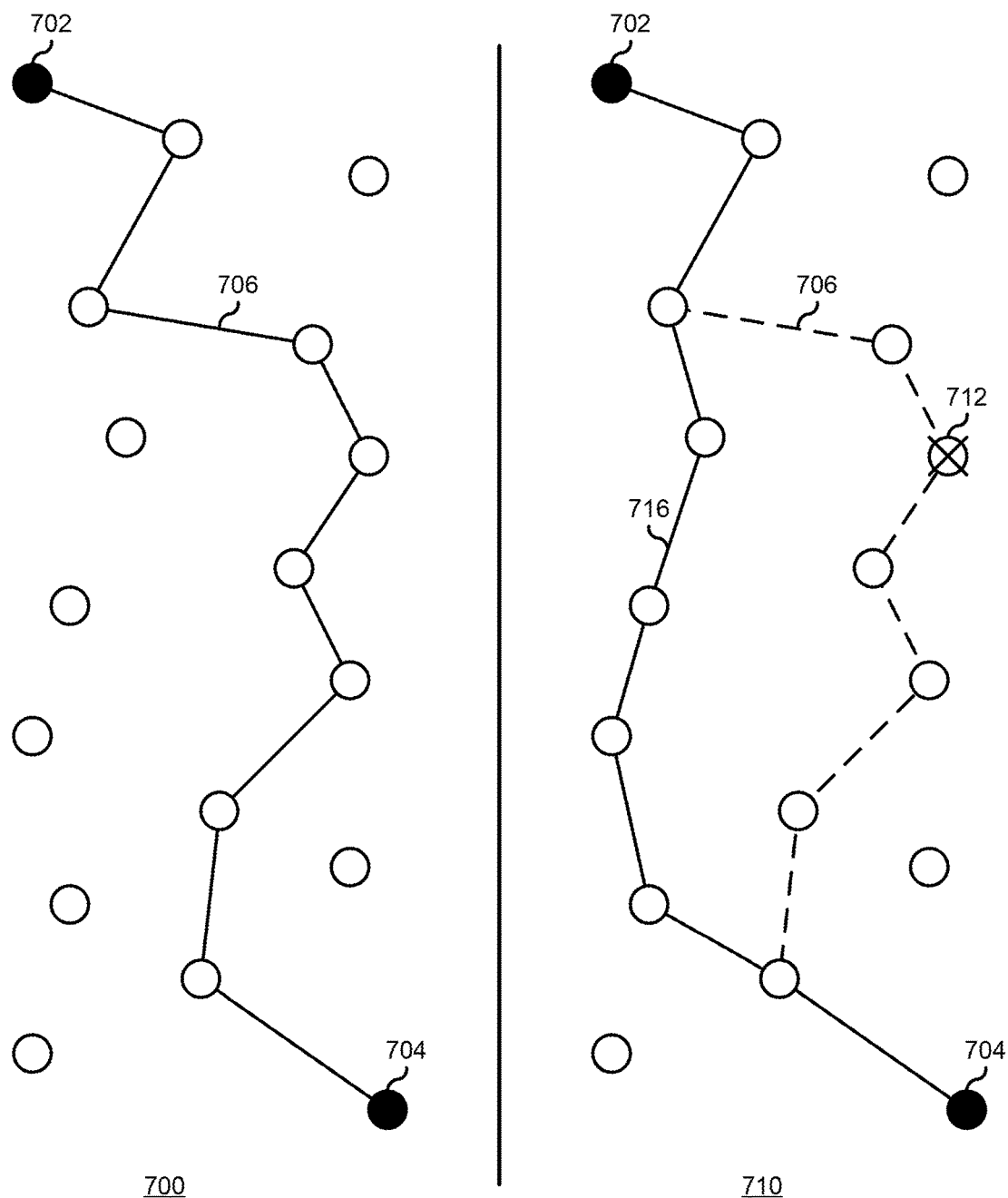
FIG. 7 is an illustration of a network that provides proxied Internet services and fault tolerant routing for an IoT device network according to an embodiment of the present disclosure.

FIG. 7 illustrates a network 700 of IIRP enabled devices that operate to provide proxied Internet services and fault tolerant routing for an IoT device network that is otherwise without access to Internet services. Here, a source IoT device 702 in the IoT device network can be pre-configured to include an IIRP stack similar to IIRP stack 120. Then, when the IoT device determines that it, or one or more other IoT devices in the IoT device network needs to access a service device 704 that is not otherwise available to the IoT device network, the IIRP enabled IoT device provides a beacon to other IIRP enabled devices that are within communication range, to determine if any of the IIRP enabled devices have access to the service device, and to request access to the service device from the other IIRP enabled devices. Further, where the IoT device network includes multiple IIRP enabled IoT devices, each of the other IIRP enabled IoT devices can request access to the Internet service from different IIRP enabled devices that are within communication range, thereby creating a path 706 of IIRP enabled devices to service device 704 for IoT device 702. FIG. 7 also illustrates an alternate network 710 is formed when an IIRP device 712 fails, rendering path 706 inoperable to provide a communication path between IoT device 702 and service device 704.

Figure 8:
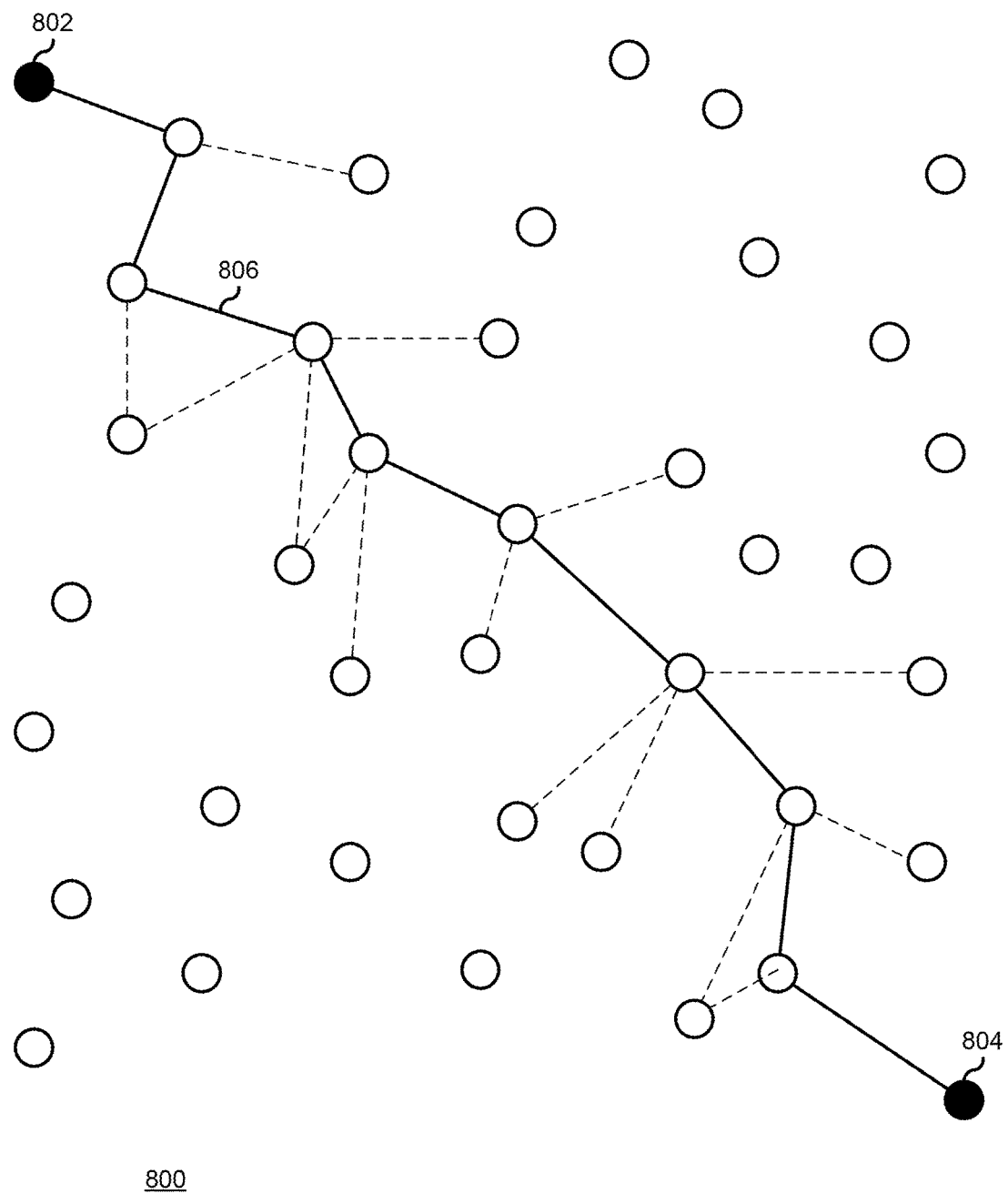
FIG. 8 is an illustration of a network that provides dynamic path discovery and path management according to an embodiment of the present disclosure.

FIG. 8 illustrates a network 800 of IIRP enabled devices that operate to provide dynamic path discovery and path management. Network 800 includes a source IoT device 802 that is pre-configured to include an IIRP stack similar to IIRP stack 120, and a destination IoT device 804 that is similarly configured. Here, IoT device 702 sends an IoT device request to the IIRP devices that are within communication range of the IoT device, and the IoT devices that are within range respond indicating that they are available to provide dynamic path discovery and path management for network 800. For example, IoT device 702 can be configured to look for a minimum of two (2) IoT devices, and a maximum of five (5) IoT devices. The responding nodes similarly send requests to the IIRP devices that are within their respective ranges. If any IIRP devices receive duplicate responses, those IIRP devices are candidates for forming redundant paths. A shortest path algorithm can be utilized to form a shortest path 806 between source IoT device 802 and destination device 804. Each IIRP device can issue a stop search operation that limits the extend of the path discovery. In a particular embodiment, the IIRP devices of network 800 operate in a split mode, where redundant paths are utilized to split the data traffic between the redundant paths, thereby creating a parallel set of paths for faster data transmission. If any IIRP device is removed from network 800, such as because the device has moved to a different location or the device has failed, then the dynamic path discovery and path management operation can search for alternate paths that mitigate the loss of the removed device.

Figure 9:
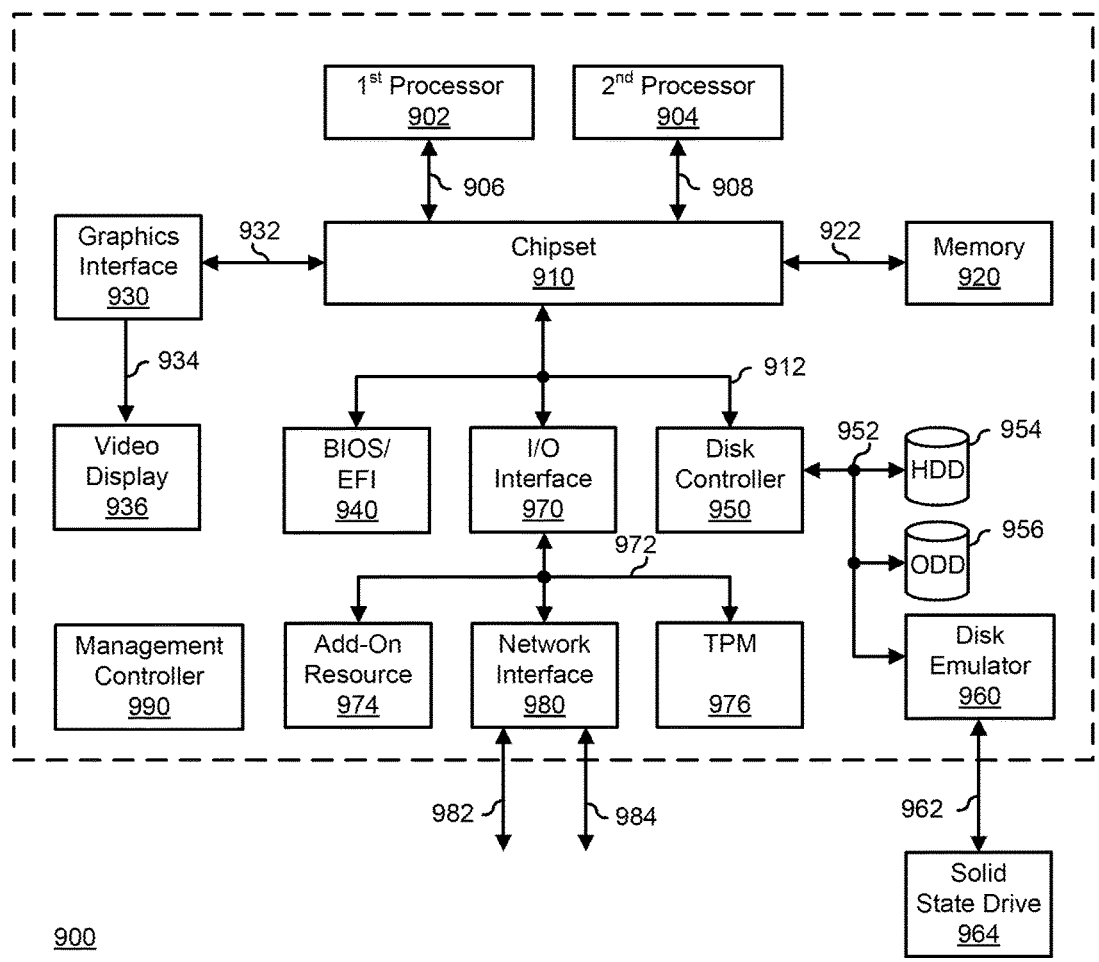
FIG. 9 is a block diagram illustrating a generalized information handling system according to an embodiment of the present disclosure.

FIG. 9 illustrates a generalized embodiment of information handling system 900. For purpose of this disclosure information handling system 900 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices, modules, or components that embody one or more of the devices, modules, or components described above, and operates to perform one or more of the methods described above. Information handling system 900 includes a processors 902 and 904, a chipset 910, a memory 920, a graphics interface 930, a basic input and output system/extensible firmware interface (BIOS/EFI) component 940, a disk controller 950, a disk emulator 960, an input/output (I/O) interface 970, a network interface 980, and a management controller 990. Processor 902 is connected to chipset 910 via processor interface 906, and processor 904 is connected to the chipset via processor interface 908. Memory 920 is connected to chipset 910 via a memory bus 922. In a particular embodiment, information handling system 900 includes separate memories that are dedicated to each of processors 902 and 904 via separate memory interfaces. An example of memory 920 includes random access memory (RAM) such as static RAM (SRAM), dynamic RAM (DRAM), non-volatile RAM (NV-RAM), or the like, read only memory (ROM), another type of memory, or a combination thereof. Graphics interface 930 is connected to chipset 910 via a graphics interface 932, and provides a video display output 934 to a video display 936.

BIOS/EFI component 940, disk controller 950, and I/O interface 970 are connected to chipset 910 via an I/O channel 912. An example of I/O channel 912 includes a Peripheral Component Interconnect (PCI) interface, a PCI-Extended (PCI-X) interface, a high speed PCI-Express (PCIe) interface, another industry standard or proprietary communication interface, or a combination thereof. Chipset 910 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI component 940 includes BIOS/EFI code operable to detect resources within information handling system 900, to provide drivers for the resources, to initialize the resources, and to access the resources.

Disk controller 950 includes a disk interface 952 that connects the disc controller to a hard disk drive (HDD) 954, to an optical disk drive (ODD) 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits a solid-state drive 964 to be connected to information handling system 900 via an external interface 962. An example of external interface 962 includes a USB interface, an IEEE 1394 (Firewire) interface, a proprietary interface, or a combination thereof. Alternatively, solid-state drive 964 can be disposed within information handling system 900.

I/O interface 970 includes a peripheral interface 972 that connects the I/O interface to an add-on resource 974, to a trusted platform module (TPM) 976, and to network interface 980. Peripheral interface 972 can be the same type of interface as I/O channel 912, or can be a different type of interface. As such, I/O interface 970 extends the capacity of I/O channel 912 when peripheral interface 972 and the I/O channel are of the same type, and the I/O interface translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof. TPM 976 can include a dedicated crypto-processor and secure storage, to ensure the integrity of information handling system 900 and to detect and prevent tampering with the operating firmware of the information handling system.

Network interface 980 represents a NIC disposed within information handling system 900, on a main circuit board of the information handling system, integrated onto another component such as chipset 910, in another suitable location, or a combination thereof. Network interface 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Management controller 990 provides for out-of-band monitoring, management, and control of the respective components of information handling system 900, such as cooling fan speed control, power supply management, hot-swap and hot-plug management, firmware management and update management for system BIOS or UEFI, Option ROM, device firmware, and the like, or other system management and control functions as needed or desired. As such, management system 990 provides some or all of the functions and features of the management systems described herein.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," a "component," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device, module, or component can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, components, resources, or programs that are in communication with one another need not be in continuous communication with each other, unless expressly specified otherwise. In addition, devices, modules, components, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
establishing a first communication path between a first Internet-of-things (IoT) device and a monitor system via a gateway device;
determining, by the monitor system, that the gateway device has failed and that the first communication path has been interrupted;
determining, by the monitor system, that a first communication device is within communications range of the first IoT device, wherein determining that the first communication device is within communication range of the first IoT device further comprises:
determining a location of the first IoT device;
selecting the first communication device based upon the location of the first IoT device;
broadcasting the location of the first IoT device to a plurality of communication devices, the plurality of communication devices including the first communication device;

determining, by the first communication device, that the first communication device is within communication range of the first IoT device in response to receiving the location of the first IoT device; and responding, by the first communication device, to the monitor system that the first communication device is within communication range of the first IoT device wherein selecting the first communication device is in response to the first communication device responding to the monitor system; and directing the first communication device to establish a second communication path between the first IoT device and the monitor system via the first communication device in response to determining that the first communication device is within communications range of the first IoT device.

2. The method of claim 1 wherein in determining that the gateway device has failed and that the first communication path has been interrupted, the method further comprises:

determining that a first communication on the first communication path from the first IoT device was not received by the monitor system; and determining that a second communication on a third communication path from a second IoT device was not received by the monitor system wherein the third communication path is established between the second IoT device and the monitor system via the gateway device.

3. The method of claim 1 further comprising:

providing the location of the first IoT device to an administration system that includes location information for a plurality of communication devices, the plurality of communication devices comprising the first communication device.

4. The method of claim 3 further comprising:

receiving, by the monitor system, an identification of the first communication device from the administration system wherein selecting the first communication device is in response to receiving the identification of the first communication device.

5. The method of claim 3 further comprising:

receiving, by the monitor system, a first identification of the first communication device and a second identification of a second communication device of the plurality of communication devices;

directing, by the monitor system, the first communication device and the second communication device to attempt to communicate with the first IoT device;

receiving, by the monitor system, a first indication from the first communication device that the first communication device successfully communicated with the IoT device; and receiving, by the monitor system, a second indication from the second communication device that the second communication device failed to communicated with the IoT device wherein selecting the first communication device is in further response to the first indication and the second indication.

6. The method of claim 1 further comprising:

determining an Internet Protocol (IP) address of the first IoT device wherein the location if the first IoT device is determined based upon the IP address of the first IoT device.

7. The method of claim 1 further comprising:

encrypting a first communication on the first communication path via a first encryption; and encrypting a second communication on the second communication path via the first encryption.

8. The method of claim 1 further comprising:

encrypting a first communication on the first communication path via a first encryption; and encrypting a second communication on the second communication path via a second encryption between the IoT device and the gateway device, and a third encryption between the gateway device and the monitor system.

9. A device network, comprising:

a first Internet-of-things (IoT) device;

a gateway device;

a first communication device; and a monitor system, that:

establishes a first communication path to the first IoT device via the gateway device;

determines that the gateway device has failed and that the first communication path has been interrupted;

determines that the first communication device is within communications range of the first IoT device, wherein in determining that the first communication device is within communication range of the first IoT device, the monitor system further:

determines the location of the first IoT device; and selects the first communication device based upon the location of the first IoT device; and broadcasts a location of the first IoT device to a plurality of communication devices, the plurality of communication devices including the first communication device; and directs the first communication device to establish a second communication path between the first IoT device and the monitor system via the first communication device in response to determining that the first communication device is within communications range of the first IoT device:

wherein the first communication device:

determines that the first communication device is within communication range of the first IoT device in response to receiving the location of the first IoT device; and responds to the monitor system that the first communication device is within communication range of the first IoT device.

10. The device network of claim 9 wherein, in determining that the gateway device has failed and that the first communication path has been interrupted, the monitor system further:

determines that a first communication on the first communication path from the first IoT device was not received by the monitor system; and determines that a third communication on a second communication path from a second IoT device was not received by the monitor system wherein the third communication path is established between the second IoT device and the monitor system via the gateway device.

11. The device network of claim 9 further comprising:

an administration system that includes location information for a plurality of communication devices, the plurality of communication devices comprising the first communication device;

wherein the monitor system provides the location of the first IoT device to the administration system.

12. The device network of claim 11 wherein the monitor system further:

receives an identification of the first communication device from the administration system wherein selecting the first communication device is in response to receiving the identification of the first communication device.

13. The device network of claim 11 wherein the monitor system further:
  receives a first identification of the first communication device and a second identification of a second communication device of the plurality of communication devices;
  directs the first communication device and the second communication device to attempt to communicate with the first IoT device;
  receives a first indication from the first communication device that the first communication device successfully communicated with the IoT device; and
  receives a second indication from the second communication device that the second communication device failed to communicated with the IoT device, wherein selecting the first communication device is in further response to the first indication and the second indication.

14. A method comprising:
  establishing a first communication path between a first Internet-of-things (IoT) device and a monitor system via a gateway device;
  determining, by the monitor system, that the gateway device has failed and that the first communication path has been interrupted;
  determining that a first communication device is within communications range of the first IoT device, wherein determining that the first communication device is within communication range of the first IoT device further comprises:
    broadcasting, by the monitor system, the location of the first IoT device to a plurality of communication devices that includes the first communication device;
    determining that the first communication device is within communication range of the first IoT device in response to receiving the location of the first IoT device; and;
    responding, by the first communication device, to the monitor system that the first communication device is within communication range of the first IoT device; and
  directing the first communication device to establish a second communication path between the first IoT device and the monitor system via the first communication device in response to determining that the first communication device is within communications range of the first IoT device.

15. The method of claim 14, wherein in determining that the gateway device has failed and that the first communication path has been interrupted, the method further comprises:
  determining that a first communication on the first communication path from the first IoT device was not received by the monitor system; and
  determining that a second communication on a third communication path from a second IoT device was not received by the monitor system wherein the third communication path is established between the second IoT device and the monitor system via the gateway device.

16. The method of claim 14, further comprising:
  providing the location of the first IoT device to an administration system that includes location information for a plurality of communication devices, the plurality of communication devices comprising the first communication device.

17. The method of claim 16, further comprising:
  receiving, by the monitor system, an identification of the first communication device from the administration system wherein selecting the first communication device is in response to receiving the identification of the first communication device.

18. The method of claim 16, further comprising:
  receiving, by the monitor system, a first identification of the first communication device and a second identification of a second communication device of the plurality of communication devices;
  directing, by the monitor system, the first communication device and the second communication device to attempt to communicate with the first IoT device;
  receiving, by the monitor system, a first indication from the first communication device that the first communication device successfully communicated with the IoT device; and
  receiving, by the monitor system, a second indication from the second communication device that the second communication device failed to communicated with the IoT device wherein selecting the first communication device is in further response to the first indication and the second indication.

19. The method of claim 14, further comprising:
  determining an Internet Protocol (IP) address of the first IoT device wherein the location if the first IoT device is determined based upon the IP address of the first IoT device.

20. The method of claim 14, further comprising:
  encrypting a first communication on the first communication path via a first encryption; and
  encrypting a second communication on the second communication path via the first encryption.

\* \* \* \* \*

UNITED STATES PATENT AND TRADEMARK OFFICE
CERTIFICATE OF CORRECTION

Page 1 of 1

PATENT NO. : 10,250,435 B2
APPLICATION NO. : 15/163237
DATED : April 2, 2019
INVENTOR(S) : Shekar Babu Suryanarayana et al.

It is certified that error appears in the above-identified patent and that said Letters Patent is hereby corrected as shown below:

On the Title Page

Item (72):
Please change:
"Inventor: Shekar Babu Suryanarayana, Bangalore (IN)"

To:
-- Inventors: Shekar Babu Suryanarayana, Bangalore (IN)
   Rochak Gupta, Bangalore (IN) --

Signed and Sealed this
Second Day of June, 2020

Andrei Iancu
*Director of the United States Patent and Trademark Office*